United States Patent [19]
Lewis

[11] Patent Number: 5,870,054
[45] Date of Patent: Feb. 9, 1999

[54] MOVING TARGET INDICATOR WITH NO BLIND SPEEDS

[76] Inventor: Bernard L. Lewis, 13318 Fort Wash. Rd., Fort Washington, Md. 20744

[21] Appl. No.: 458,006

[22] Filed: Dec. 10, 1982

[51] Int. Cl.$^6$ .................................................. G01S 13/528
[52] U.S. Cl. ............................................................ 342/163
[58] Field of Search .............................. 343/7.7, 17.2 PC, 343/17.1 R, 17.1 PF; 342/159, 160, 162, 163, 98

[56] References Cited

U.S. PATENT DOCUMENTS

| Re. 27,092 | 3/1971 | Stifter et al. | 342/98 |
|---|---|---|---|
| 2,746,033 | 5/1956 | Bachmann | 342/94 |
| 3,169,243 | 2/1965 | Kuhrdt | 342/163 |
| 3,225,349 | 12/1965 | Thor | 342/163 |
| 3,417,396 | 12/1968 | Stifter et al. | 342/98 |
| 3,480,953 | 11/1969 | Shreve | 342/163 |
| 4,057,800 | 11/1977 | Ganz | 343/17.1 PF |
| 4,137,532 | 1/1979 | Taylor, Jr. et al. | 343/17.1 PF |
| 4,249,178 | 2/1981 | Butler | 342/163 |
| 4,377,811 | 3/1983 | Mooney, Jr. et al. | 343/5 FT |

*Primary Examiner*—John B. Sotomayor
*Attorney, Agent, or Firm*—Thomas E. McDonnell; Charles Stockstill

[57] ABSTRACT

A moving target indicating system wherein a pulse source which generates radiofrequency drive pulses at a predetermined pulse repetition frequency is connected to the inputs of a pair of channels. The first channel includes a phase-dispersive filter having a first phase-slope dispersion characteristic, while the second channel has a phase-dispersive filter having a phase-slope dispersion characteristic which is the negative of that of the first filter. A pulse group comprising the output of the first and the second channels is transmitted periodically as each drive pulse is applied. The pulse repetition frequency is sufficiently low that when transmitted, echos of only one pulse of each group are received at a time. Due to the "matched" or "conjugate" phase-dispersive characteristics of the filters in the respective channels, the first channel operates in reception upon the reflected pulse originally generated in the second channel and compresses it thus resynthesizing or reconstituting a short duration pulse like the original, while the second channel operates in reception upon the reflected pulse generated in the first channel, compressing it to reconstitute a short duration pulse like the original. A canceler is switched between the outputs of the first and second channels to receive the two resulting reconstituted pulses of each group. In the usual application, fixed target information is cancelled out and moving target information is derived for application to a display device.

1 Claim, 1 Drawing Sheet

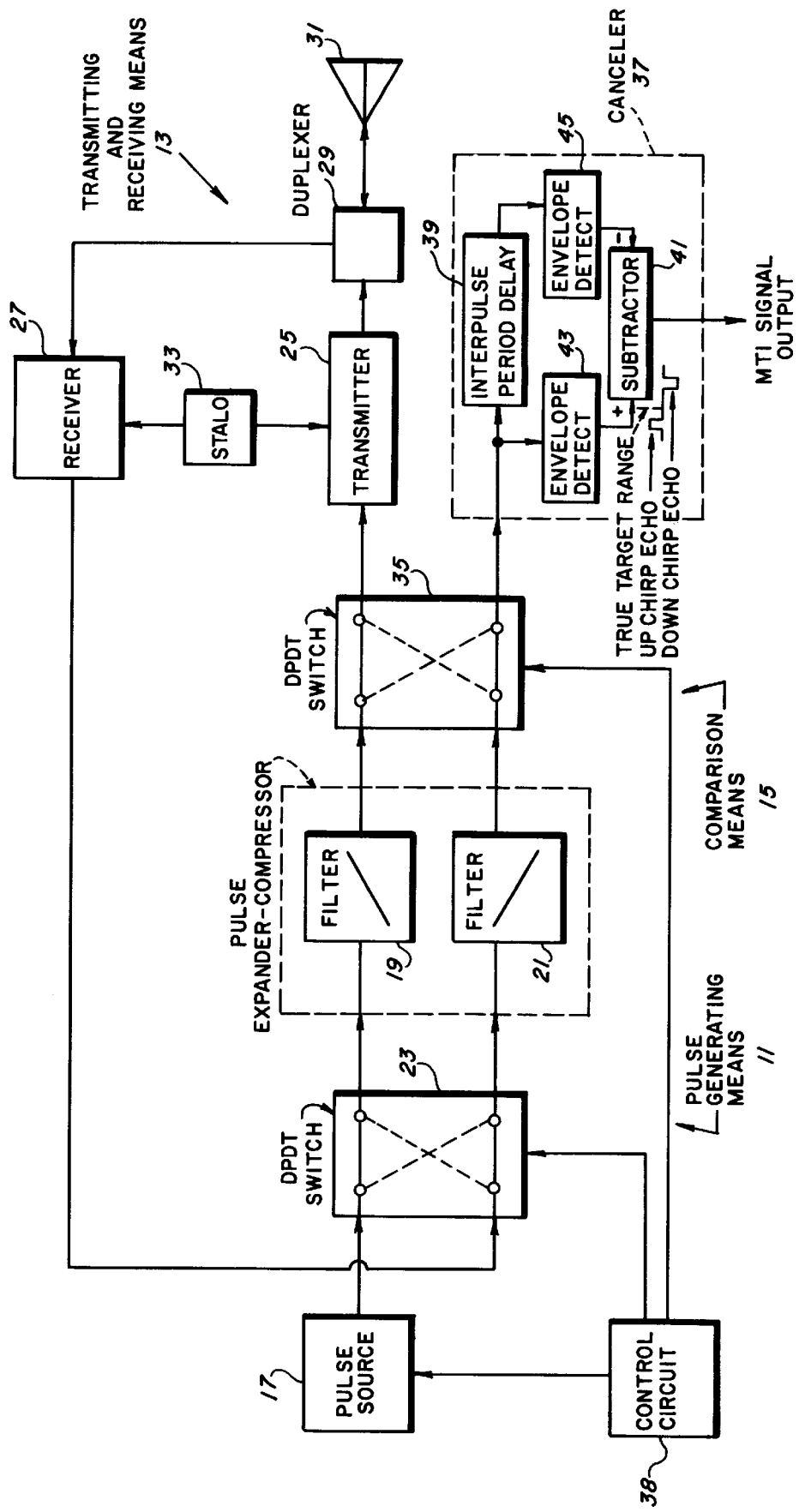

MOVING TARGET INDICATOR WITH NO BLIND SPEEDS

BACKGROUND OF THE INVENTION

This invention relates to a target detecting radar system and, in particular, to a radar system for detecting targets having a radial velocity relative to the system.

A radar system, in general, includes a transmitter adapted to radiate short duration, high frequency, pulses of electromagnetic energy and a receiver responsive to the echo pulses returned when the radiated pulses impinge upon an object. The information provided by the echo pulses is derived and presented on an indicating device.

A radar system which is adapted to distinguish between fixed objects and moving objects and which applies to the indicating device signals representing moving targets only is referred to as a moving target indicating (MTI) system. Distinction between moving and fixed targets is normally attained by utilizing the Doppler effect, i.e., the phase change of the echo with respect to the transmitted pulse due to the radial velocity of the target with respect to the radar system. In contrast, the phase relationship between a transmitted pulse and an echo resulting from a fixed target is the same for successive pulses. The fact that for successive pulses the relative phase of the transmitted pulse and the echo varies when the target is moving, and is constant when the target is fixed, provides a means for distinguishing between fixed and moving targets.

One type of prior art moving target indicating system periodically transmits a group of two pulses at a predetermined repetition frequency, the Doppler phase-shift produced between the two pulses of a group being utilized to detect moving targets. An important advantage of this type of system is the effective elimination of so-called "blind speeds" by closely spacing the pulses of a group. "Blind speeds" result from the failure of a moving target indicating system to detect phase changes of whole cycles from objects which move toward or away from the radar system a distance equal to an integral number of half-wave lengths of the transmitted radio frequency energy during the interval between pulses.

One such moving target indicating radar system is disclosed in U.S. Pat. No. 3,225,349 issued to Robert C. Thor on Dec. 21, 1965. In this system, a radar transmits an upswept frequency pulse for a time T. After a time τ-T, the radar transmits another pulse. On the second pulse the radar changes the direction of the frequency sweep. The cycle is repeated after a delay during which echos are received and pulse-compressed. Two receiver channels in the radar contain respective matched filters. The first filter compresses echoes of the first pulse, while the second filter compresses echoes of the second pulse. Stationary target echos appear at the same range on successive transmissions, whereas radially moving targets appear at different ranges on successive transmissions. Because of this difference in behavior, echoes from the first pulse can be subtracted from echos from the second pulse to cancel non-moving target echos, without cancelling moving targets echos.

This system suffers from the following disadvantage. Since the interpulse period of the radar is short, long-range echos of the first pulse arrive at the radar at the same time as short-range echos of the second pulse. Thus, the filters in the receiver each act on both matched and mismatched signals. In the presence of distributed clutter, the compressor limiter in the two receiver channels will not suppress the mismatched component and the moving target indicating radar system will not provide significant clutter cancellation or subclutter visibility.

SUMMARY OF THE INVENTION

It is therefore one object of this invention to enhance radar echoes from moving targets and to suppress echoes from stationary or slowly moving scatterers, like land or sea clutter, rain and chaff clutter.

Another object is to eliminate moving target indicator blind speeds.

These and other objects of this invention are achieved by a moving target indicating system wherein phase-modulated pulses are generated in groups of two at a pulse repetition frequency sufficiently low that when transmitted, echoes of only one pulse of each group are received at a time. The initial and terminal pulses of each group have differing phase modulations. The pulses are transmitted and their echoes received, and a timing comparison is made between the initial and terminal pulses. In making the timing comparison, echoes from successive pulse transmissions are switched into an appropriate filter for that waveform rather than simultaneously entering both matched and mismatched filters. This improves the cancellation of distributed clutter.

Additional advantages and features will become apparent as the subject invention becomes better understood by reference to the following detailed description when considered in conjunction with the accompanying drawings wherein:

BRIEF DESCRIPTION OF THE DRAWING

The sole FIGURE is a block diagram of an embodiment of the moving target indicating system of the invention.

DETAILED DESCRIPTION OF THE PREFERRED EMBODIMENT

Referring to the FIGURE, the moving target indicating radar system includes a pulse-generating means 11 which generates phase-modulated pulses in groups of two at a pulse-repetition frequency sufficiently low that when transmitted, echoes of only one pulse of each group are received at a time; a transmitting-and-receiving means 13 which transmits the pulses and receives the echoes thereof; and a comparison means 15 which makes a timing comparison between the initial and terminal pulses of each group. The initial pulse of each group has a first phase-modulation (or equivalent frequency-modulation), and the terminal pulse of each group has a second phase-modulation (or equivalent frequency-modulation). For example, the initial and terminal pulses may be linear-frequency-modulation-coded or coded with the derivatives thereof (step approximation-to-linear frequency modulation or phase-coded equivalent). Also, the initial and terminal pulses may have respective phase-slope dispersions of which one is the negative of the other. That is to say, in one pulse, the lower frequencies are adjacent the leading edge of the pulse and the higher frequencies are adjacent the trailing edge of the pulse (positive phase-slope dispersion), whereas in the other pulse, the higher frequencies are adjacent the leading edge of the pulse and the lower frequencies are adjacent the trailing edge of the pulse (negative phase-slope dispersion).

While the pulse-generating means 11 may take a variety of forms, conveniently it may take the form shown in FIG. 1 of a pulse source 17, a pair of filters 19 and 21 (together comprising a pulse-expander), and a switch 23 for switching the output of the pulse source 17 to one or the other of the filters 19 and 21. Filters 19 may comprise, for example, a pair of dispersive delay filters having identical bandwidths, center frequencies and time-bandwidth products. When the initial and terminal pulses of the two-pulse groups have phase-slope dispersions of which one is the negative of the other, the filter 19 has a delay dispersion of the same sign as the phase slope dispersion of the initial pulse, and the filter 21 has a delay dispersion which is the negative of that of filter 19. The delay dispersion of a filter is said to be positive when the phase delay imposed upon the higher frequencies of a pulse passed through the filter is greater than the phase delay imposed upon the lower frequencies. The delay dispersion of such a filter and the phase-dispersive characteristics of the pulse which it produces (i.e., positive phase slope dispersion) may be illustrated diagrammatically as shown in FIG. 1 by means of a diagonal line having a positive slope (i.e., a graph of frequency vs. time delay). The delay dispersion is said to be negative when the phase delay imposed upon the lower frequencies is greater than the phase delay imposed upon the higher frequencies. The delay dispersion of such a filter and the phase-dispersive characteristics of the pulse which it produces (i.e., negative phase slope dispersion) may be illustrated diagrammatically as shown in the FIGURE by means of a diagonal line having a negative slope.

While the transmitting and receiving means 13 may take a variety of forms, conveniently it may take the form shown in the FIGURE of a transmitter 25 and a receiver 27 connected by a duplexer 29 to an antenna 31; a stable local oscillator 33 connected to both the transmitter and the receiver, a switch 35 which switches the input of the transmitter 25 between the outputs of the filters 19 and 21 when pulses are transmitted, and the switch 23 which also functions to switch the output of the receiver 27 between the inputs of the filters 19 and 21 when echoes are received.

The comparison means 15 also may take a variety of forms, but conveniently it may take the form illustrated in the FIGURE of the filter 19 and the filter 21 (together comprising a pulse-compressor), a canceler 37, and the switch 35 which also functions to switch the input of the canceler 37 between the outputs of the filters 19 and 21 when echoes are received.

A conventional control circuit 38 is common to the pulse-generating means 11, the transmitting and receiving means 13 and the comparison means 15, and is connected to the pulse source 17 and to the switches 19 and 21.

The switch 23 may comprise, for example, a double-pole, double-throw electronic switch having a first pair of contacts connected to the pulse source 17 and to the receiver 27 respectively, a second pair of contacts connected to the filters 19 and 21 respectively, and a control input connected to the control circuit 38. The switch 35 may comprise, for example, a double-pole, double-throw electronic switch having a first pair of contacts connected to filters 19 and 21 respectively, a second pair of contacts connected to the transmitter 25 and the canceler 37 respectively, and a control input connected to the control circuit 38.

The canceler 37 may comprise, for example, a conventional two-pulse canceler having a delay line 39 whose input is connected to a contact of the switch 35, and a subtractor 41 whose inputs are connected to the input and to the output of the delay line 39 respectively by way of respective envelope detectors 43 and 45. The delay line 39 introduces a delay t equal to the pulse repetition interval.

In operation, the control circuit 38 synchronizes the operation of the pulse source 17 and the switches 23 and 35.

The pulse source 17 generates short-duration radiofrequency drive pulses in groups of two at a pulse repetition frequency sufficiently low that when transmitted, echos of only one pulse of each group are received at a time.

When the initial pulse of each group is generated, the switches 23 and 35 adopt their first position, indicated by solid lines, wherein the filter 19 is connected between the output of the pulse source 17 and the input of the transmitter 25, and the filter 21 is connected between the output of the receiver 27 and the input of the canceler 37. The filter 19 generates from the initial drive pulse of each group an elongated version of the pulse having the first phase modulation. The elongated initial pulse is converted to the carrier frequency of the transmitter 25 by heterodyning with the stable local oscillator 33 and is coupled to the antenna 31 through the duplexer 29. The returning echo pulse resulting from impingement of the radiated intial pulse upon a target passes from the common antenna 31 through the duplexer 29 to the receiver 27 where it is restored to its original radiofrequency carrier frequency by heterodyning with the stable local oscillator 33. The filter 21 is phase-matched to the initial pulse. That is, it has a delay dispersion whose sign is the negative of the phase-slope dispersion of the initial pulse. Thus, the filter 21 collapses the various phase components of the initial pulse into its original short duration form (the trailing edge tends to overtake the leading edge), and the reconstituted initial pulse is fed to the canceler 37.

When the terminal pulse of each group is generated, the switches 23 and 35 adopt their second position, indicated by dotted lines, wherein the filter 21 is connected between the output of the pulse source 17 and the input of the transmitter 25, and the filter 19 is connected between the output of the receiver 27 and the input of the canceler 37. The filter 21 generates from the terminal drive pulse of each group an elongated version of the pulse having the second phase modulation. The elongated terminal pulse is converted to the carrier frequency of the transmitter 25 by heterodyning with the stable local oscillator 33 and is coupled to the antenna 31 through the duplexer 29. The returning echo pulse resulting from impingement of the radiated terminal pulse upon a target passes from the common antenna 31 through the duplexer 29 to the receiver 27 where it is restored to its original radiofrequency carrier frequency by heterodyning with the stable local oscillator 33. The filter 19 is phase-matched to the terminal pulse. That is, it has a delay dispersion whose sign is the negative of the phase-slope dispersion of the terminal pulse. Thus, the filter 19 collapses the various phase components of the terminal pulse into its original short duration form (the trailing edge tends to overtake the leading edge), and the reconstituted terminal pulse is fed to the canceler 37 at a time t after the reconstituted initial pulse was fed to the canceler. Since the pulse repetition frequency is sufficiently low that echoes of only one pulse of a group are received at a time, the filters 19 and 21 are never phase-mismatched to the pulses applied at their inputs.

The canceler 37 brings desired output pulses from the filters 19 and 21 into timed correspondence and subtractively combines them to cancel out fixed target information and derive moving target information. Specifically, a pair of returned echo pulses resulting from impingement of the two-pulse group upon a target will exhibit a relative time shift x. If the pulses represent reflections from a stationary target, x=t. The pulses at the outputs of the envelope detectors 43 and 45, whose inputs are separated by the delay line 39 (whose delay equals t) are coincident, and the subtractor 41 produces no output signal. If the pulses represent reflections from a moving target, x is either greater or less than t, the pulses at the outputs of the envelope detectors 43 and 45 are not coincident, and the subtractor 41 produces an output signal. The output signal looks like a differentiated positive rectangular pulse-like a positive pulse followed by an equal magnitude negative pulse. The separation between the positive and negative components is directly proportional to the target velocity, and the true target range is the midpoint between the positive and negative pulse components.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A moving target indicating system comprising:

pulse-generating means for generating phase-modulated pulses in groups of two at a pulse repetition frequency sufficiently low that when transmitted, echoes of only one pulse of each group are received at a time, the initial and terminal pulses of each group having phase-slope dispersions of which one is the negative of the other, the pulse-generating means including, a pulse source for generating drive pulses in groups of two at the pulse repetition frequency, a first filter for generating from the terminal pulse of each group an elongated version having one of the phase-slope dispersions;

a second filter for generating from the initial pulse of each group an elongated version having the other phase-slope dispersion; and a first switch connected for switching the output of the pulse source between the input of the first filter and the input of the second filter according to which drive pulse of a group is being generated so that the terminal pulse is routed to the first filter and the initial pulse is routed to the second filter;

transmitting-and-receiving means for transmitting the pulses and receiving the echoes thereof; and comparison means for making a timing comparison between the initial and terminal pulses, the comparison means including, the first filter, the first filter also functioning for collapsing the various phase components of the initial pulse of each group into a much narrower pulse than the transmitted pulse, the second filter, the second filter also functioning the collapsing the various phase components of the terminal pulse of each group into a much narrower pulse than the transmitted pulse, a canceler for bringing desired output pulses from the first and second filter into timed correspondence and for subtractively combining them to cancel out fixed target information and derive moving target information, and a second switch connected for switching the input of the canceler between the output of the first filter and the output of the second filter according to which pulse of a group is being generated, so that the corresponding compressed pulse is routed to the canceler.

* * * * *

UNITED STATES PATENT AND TRADEMARK OFFICE
CERTIFICATE OF CORRECTION

PATENT NO. : 5,870,054
DATED : February 9, 1999
INVENTOR(S) : Bernard L. Lewis

It is certified that error appears in the above-identified patent and that said Letters Patent is hereby corrected as shown below:

On the title page, Item [73] insert the following:

Assignee: The United States of America
             as represented by the
             Secretary of the Navy Signed and Sealed this Twenty-ninth Day of June, 1999

*Attest:*

Q. TODD DICKINSON

*Attesting Officer*     *Acting Commissioner of Patents and Trademarks*